United States Patent Office 3,383,588
Patented May 14, 1968

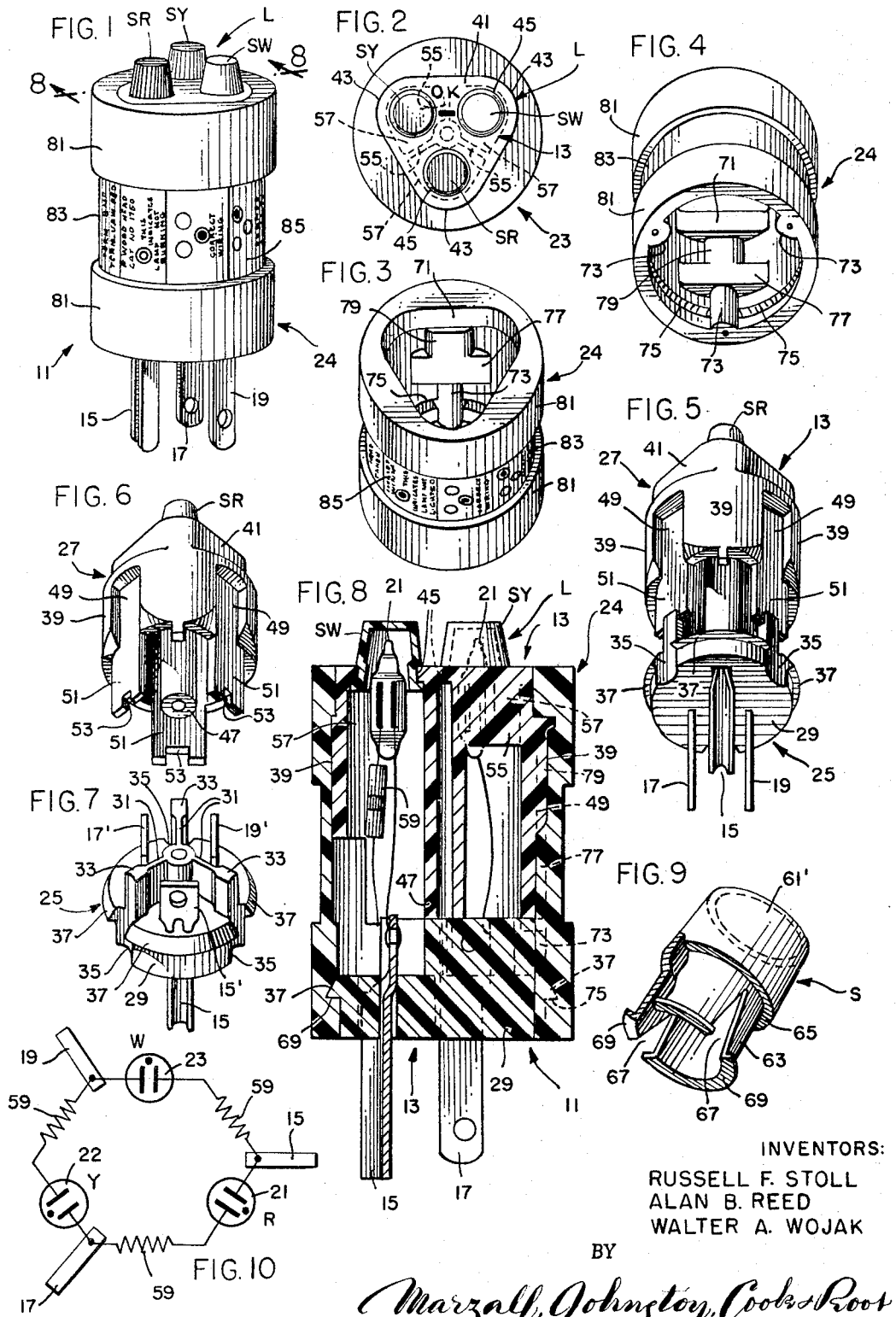

3,383,588
THREE PRONG CIRCUIT TESTER FOR ELECTRICAL OUTLET SOCKETS INCLUDING A FRAME MEANS FORMED WITH ADJACENT CHAMBERS FOR HOUSING VISUAL INDICATORS
Russell F. Stoll, Northbrook, Alan B. Reed, Oak Park, and Walter A. Wojak, Chicago, Ill., assignors to Daniel Woodhead Company, Chicago, Ill., a corporation of Illinois
Filed Aug. 23, 1965, Ser. No. 481,804
11 Claims. (Cl. 324—51)

ABSTRACT OF THE DISCLOSURE

An electrical circuit tester having a composite insulating frame structure of molded components, including a preformed base carrying three connection prongs, a housing component providing separate chambers for receiving each a corresponding indicator lamp, whereby the lamps may be connected with the prongs, in position to extend each in its corresponding chamber, prior to the mounting and attachment of the housing on the base, the chambers extending longitudinally, in the housing, and in parallel, side-by-side relation, whereby the housing may be assembled and secured on the base, merely by applying the housing axially into mounted position on the base, thereby simultaneously sliding the lamps into said chambers, and a sleeve of flexible insulating material forming an enclosing sheath adapted to embrace and interlockingly embrace the sides of the housing and base to aid in holding the components of the structure together as an assembly unit.

The present invention relates in general to electrical circuit testers, and has more particular reference to an improved testing device adapted for insertion in electrical outlet sockets or receptacles to determine whether or not the electrical contacts or terminals thereof are correctly connected with the conductors of an associated electrical energy supply system.

The contact terminals of three-wire outlet sockets or receptacles are adapted for connection, respectively, with the hot or ungrounded circuit conductor, the neutral or grounded circuit conductor, and the non-current carrying equipment grounding conductor, it being conventional to polarize such receptacles so that equipment connecting plugs may be applied therein in only one of the three possible connection positions, to assure that the hot, neutral and grounding terminals of the plug may be connected only with the corresponding terminals of the outlet socket. Accordingly, it is essential that the hot, neutral and grounding conductors of outlet sockets be correctly wired or connected each with the corresponding conductor of the supply line or cable to which it is attached.

An important object of the present invention is to provide a neat, compact, handy and reliable receptacle tester adapted for plug-in application in a supply line connected receptacle to be tested to give an instant signal indicating either that the receptacle terminals are correctly wired or connected with the conductors of its associated electrical supply line, or that the receptacle is incorrectly wired in any one of several ways in which an outlet socket may be incorrectly connected with a three-wire supply line.

A further important object of the invention is to provide a receptacle tester adapted to distinguishably indicate wiring errors, including the reversed connection of the hot and neutral terminals of the receptacle respectively with the neutral and hot conductors of the supply line, the reversed connection of the hot and grounding terminals of the receptacle respectively with the grounding and hot conductors of the supply line, the connection of the neutral terminal of the receptacle with the hot conductor of the supply line, and the failure to connect either the hot terminal, the neutral terminal or the grounding terminal of the receptacle with the corresponding conductor of the supply line.

Another important object of the invention is to provide a testing unit of the character mentioned having means for visually indicating correct receptacle connection or any of several possible receptacle connection errors; a further object being to provide the tester with a plurality of selectively energizable signaling lamps for indicating the wired condition of a tested receptacle; a still further object being to provide at least three visual indication lamps having means for interdistinguishing the same, as by unlike color or by distinctive indicia applied on the lamps or on associated lenses or lamp shades; yet another object of the invention being to provide inexpensive lamp elements positioned in the testing unit to illuminate lamp shades or lenses having interdistinguishable color characteristics; a still further object being to provide low cost molded plastic lamp shades, as of nylon, tinted in distinguishable colors to signal the connected condition of the terminals of electrical outlet sockets or receptacles.

Still another important object is to provide a tester of the character mentioned comprising a support frame of rigid material carrying contact prongs at an end thereof in position to be plugged into the receptacle to be tested, the frame also housing and supporting indicating lamps electrically connected with said prongs, and carrying a cover of elastomeric insulating material secured upon the frame in position enclosing the frame mounted lamps and the electrical connections thereof with said contact prongs; a further object being to form a frame comprising separately formed sections, including prong carrying and lamp enclosing and housing sections, whereby to facilitate the assembly and connection of the lamps upon the prongs prior to the attachment of the lamp enclosing and housing section upon the prong carrying section; a still further object being to form the frame sections of molded plastic material of a sort adapted to be readily secured together by applying a suitable solvent and merely pressing together the parts to be joined; a still further object being to form the frame sections as molded elements of high impact polycarbonate, such as the material produced by General Electric Company, under the trademark Lexan.

Yet another important object is to provide an electrical plug device comprising a support frame carrying contact prongs and a cover made of elastomeric material, such as butyl, nitrile, isoprene and chloroprene rubber, or polyvinyl chloride.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

FIG. 1 is a perspective view of a circuit tester embodying the present invention;

FIG. 2 is a top view of the circuit tester shown in FIG. 1;

FIG. 3 is a perspective view of a cover which forms a component of the device shown in FIG. 1, the cover being illustrated as seen when looking into its upper end;

FIG. 4 is a perspective view of the cover shown in FIG. 3 as seen when looking into its lower end;

FIG. 5 is a perspective view of a support frame which forms a part of the structure shown in FIG. 1;

FIGS. 6 and 7 are perspective views of component frame sections which when secured together form the frame shown in FIG. 5;

FIG. 8 is an enlarged sectional view taken substantially along the line 8—8 in FIG. 1;

FIG. 9 is a partially sectionalized perspective view of a lamp shade or lens of the sort employed in the device shown in FIG. 1; and FIG. 10 is a diagram of electrical connections.

To illustrate the invention the drawings show a circuit tester 11 adapted to indicate the wired condition of a conventional electrical outlet socket or receptacle. In this connection, it should be understood that 125 volt, single-phase electrical power supply systems commonly comprise three conductors or wires, namely, the "hot wire" or ungrounded power supply conductor, the "neutral" or grounded power supply conductor, and the "ground wire" which forms the equipment grounding conductor of the system, and which normally carries no current. Outlet sockets provided to facilitate the connection of electrical equipment or apparatus in electrical power supply systems comprise contact terminals electrically connected with the conductors of the associated system and appropriately spaced to receive and form electrical connection with the corresponding connection electrodes or prongs of plugs commonly provided for connecting equipment energizing cords or cables with the conductors of the supply system. Accordingly, the prong engaging terminals of outlet sockets correspond with and must be correctly connected to the "hot," "neutral" and "ground" conductors of the associated power supply system.

In order to provide for the rapid checking of connected electrical outlet sockets or plug receptacles to determine whether or not the contact terminals thereof have been correctly connected each with its corresponding wire of an associated power supply system, the circuit tester of the present invention may comprise a frame 13, contact prongs 15, 17 and 19 on the frame, at an end thereof, in position for insertion, in an outlet socket to be tested, in electrical contact with the corresponding terminals thereof. The tester may include indicating means L, carried on the frame in position to be seen at a viewing station remote from the contact prongs, the indicating means preferably comprising interdistinguishable lamps 21, 22 and 23 electrically connected with the contact prongs. The tester also preferably includes a cover 24 mounted on the frame in position enclosing the indicating means and the electrical connections thereof with said prongs.

As shown more particularly in FIGS. 5 through 8, the frame 13 may comprise a pair of separately formed molded plastic sections 25 and 27, which may conveniently be made of rigid, self-supporting and preferably fire-resistant material, such as the high impact polycarbonate made by General Electric Company under the trademark Lexan. The section 25 may comprise a disc forming a mounting base for the prongs 15, 17 and 19 on which the lamps 21, 22 and 23 may be supported and electrically connected. The prongs may be embedded and secured in the base as it is formed in a suitable die, said prongs extending through the disc to provide the socket terminal engaging prongs 15, 17 and 19, and connection lugs 15', 17' and 19' respectively projecting at and outwardly of the bottom and top sides of the disc. The section 27 forms a lamp enclosing housing adapted to be applied upon and secured to the base section 25 in position enclosing the lamps 21, 22 and 23 after the same have been mounted upon and electrically connected to the connection lugs 15', 17' and 19' which extend upwardly of the base 25.

As shown more particularly in FIG. 7 of the drawings, the base 25 may be formed with upwardly extending partitions 31 interconnected at the center of the disc 29 and radiating thence toward its periphery, each partition making angles of the order of 120° with respect to the other partitions and each partition extending between a corresponding adjacent pair of the connection lugs 15', 17' and 19'. The outer ends of the partitions are preferably formed to provide pedestals 33 somewhat thicker than the partition portions inwardly thereof. The frame segment 25 may be formed with orientation notches 35 extending parallel to the central axis of the segment and equally spaced on the periphery of the disc 29, preferably in registration with the outer sides of the pedestals 33; and the disc may be provided with arcuate marginal locking lips 37 extending between the notches 35.

As shown more especially in FIG. 6 of the drawings, the segment 27 may comprise a hollow member having a generally cylindrical portion 39 and a triangular portion 41 integrally secured on and closing the upper end of the cylindrical portion, said triangular portion having arcuate corners 43 and circular window openings 45 formed through the triangular portion 41 in the corners thereof. The segment 27 may be provided with an axial stem 47 extending centrally within the cylindrical portion 39 from the inner face of the triangular portion 41, the remote end of the stem projecting outwardly of the lower open end of the cylindrical portion 39.

The outer surfaces of the cylindrical portion 39 may be formed with circumferentially spaced, longitudinally extending depressions 49 commencing in the upper portions of the cylindrical portion, adjacent the triangular portion 41, and extending thence to the opposite or lower open end of the cylindrical portion, said depressions forming outwardly opening seats on the cylindrical portion, said seats extending into said cylindrical portion to a depth of the order of one-half the thickness of the cylindrical portion. The bottoms of the seats 49 may lie in planes parallel with respect to and substantially coinciding with the planes defining the flat sides of the triangular portion 41. As shown in FIG. 8, the planes of the seat bottoms preferably extend in position offset slightly outwardly of the planes of the sides of the triangular portion 41. At its lower open end, the cylindrical portion 39 may be formed with downwardly extending legs 51 comprising extensions of the walls of the cylindrical portion 39 which form the bottoms of the seats 49, the lower ends of said legs being formed with notches 53 sized to snugly receive the upper ends of the pedestals 33 of the frame section 25.

The frame section 27 may be formed with bracing partitions 55 extending radially of the stem 47 and the walls of the cylindrical portion 39 medially of the seats 49, said partitions 55 being integrally united with the stem 47, the cylindrical portion 39 and the triangular portion 41. The partitions 55, accordingly, serve to divide the interior of the triangular portion 41 and the adjacent upper end of the cylindrical portion 39 into chambers 57 for the reception of the lamps 21, 22 and 23. The lamps may conveniently comprise small glow discharge lamps comprising each a generally cylindrical sealed glass envelope containing neon, or other suitable gaseous conduction medium, and a pair of spaced electrode plates mounted on and electrically connected with conductors extending outwardly of the envelope through a pinch seal, the envelope having an outer diameter of the order of one-quarter inch and an overall length of the order of three-quarters inch. The lateral wall of the envelope may have thickness of the order of one thirty-second inch and the length of the chamber within the envelope may be of the order of three-eighths inch. The dimensions of the lamps, however, are not at all critical, it being necessary only that the lamps fit easily within the chambers 57. Each of the lamps is preferably connected in series with a ballast resistor 59 having a resistance value of the order of twenty-two thousand ohms.

As shown more particularly in FIG. 10 of the drawings, the three lamps 21, 22 and 23, with their series connected ballast resistors, may be electrically connected respectively between the electrode pairs 15–17, 17–19 and 19–15. As a consequence, the lamps will be selectively excited to glow in response to correct or defective wiring conditions in an electrical outlet into which the testing device is plugged, as indicated in the following chart:

| Wiring condition: | Lamps lit up |
| --- | --- |
| Correct wiring | 22 and 23. |
| Open ground wire | 22 only. |
| Open neutral wire | 23 only. |
| Hot and neutral wires reversed | 21 and 22. |
| Hot and ground wires reversed | 21 and 23. |
| Hot wire connected on neutral terminal, hot terminal unwired | 21 only. |
| Open hot wire | None. |

In order to interdistinguish the lamps which light up when the device is in operation, the same may be coded or identified in any suitable, preferred or convenient fashion. If desired, the lamps may be marked with interdistinguishable characters or indicia, or may be tinted in contrasting colors; and, in this connection, it is preferable to associate the color red, indicated by R, with the lamp 21 connected between the terminals 15 and 17, to associate the color yellow, indicated by Y, with the lamp 22 connected between the terminals 17 and 19, and to associate the color white, indicated by W, with the lamp 23 connected between the terminals 19 and 15, as shown in FIG. 10.

The testing device of the present invention may be assembled by electrically connecting the lamps with the terminals 15, 17 and 19 by soldering the lead conductors of the lamps and ballast resistors respectively between the connection lugs 15', 17' and 19' in position supporting the lamps at a desired elevation above the connection lugs in a generally triangular arrangement corresponding with the arrangement of the cavities 57 of the component 27. Thereupon, the notched ends of the legs 51 of the upper component 27, and if desired the lower end of the stem 47, may be dipped into a suitable solvent, such as methylene chloride, where the components 25 and 27 are made of Lexan plastic, after which the component 27 may be applied to the component 25 in fashion receiving the lamps 21, 22 and 23 in the cavities 57 and engaging the upper ends of the pedestals 33 in the notches 53, the lower end of the stem 47 abutting upon the upper edges of the partitions 31 where they join at the center of the component 25. The parts 25 and 27 should be held in pressed-together condition until they are firmly joined and integrated together at the junction of the pedestals 33 with the lower ends of the legs 51 and at the junction of the meeting ends of the partitions 31 with the lower end of the stem 47.

The foregoing procedure greatly simplifies the mounting and electrical connection of the lamps on the connection lugs of the prong electrodes 15, 17 and 19 and provides a rugged frame 13 enclosing the lamps in position protecting the same against damage or breakage through any impact that may be applied to the device during its service life. The integrated sections 25 and 27 provide an exceedingly strong and resilient housing for the enclosure and protection of the signal lamps.

The lamps may, of course, be directly coated with a layer of appropriate pigment, or suitable identifying indicia may be marked directly thereon, if desired. It is preferable, however, to provide lenses or lamp shades S of the sort shown in FIG. 9 of the drawings for enclosing the lamps in the openings 45, said shades or lenses preferably comprising hollow cup-shaped members 61 each having a dependent skirt 63 extending from the rim of the cup-shaped member and defining a peripheral shoulder 65 at said rim, the outer or lower end of the skirt being formed with one or more longitudinal notches 67 extending from said lower end upwardly toward the shoulder 65. Said lower edge may also be provided with outwardly extending lips or flanges 69, between the notches 67, so that the lamp shades S may be mounted in the window openings 45 by squeezing the skirt inwardly, between the notches, for insertion longitudinally through the openings 45 to mount the lamp shades in position held on the frame 13 by engaging the triangular section 41 between the shoulders 65 and flanges 69 of the lamp shade elements.

The lamp shades S may conveniently be formed of a polyamide plastic, such as nylon, upon which lamp identifying indicia may be marked, or the shades may be appropriately tinted with identifying colors such as red, yellow and white. Preferably the lamp 21, which is connected between the terminals 15 and 17, is enclosed behind a lens or shade S that is tinted red, while the lamp 22, connected between the terminals 17 and 19, is enclosed behind a yellow tinted lens or shade S, while a shade S tinted white encloses the lamp 23 that is connected between the terminals 19 and 15. Since actuation of the lamps 22 (yellow) and 23 (white) indicate a correctly wired receptable, the characters "OK" or other symbol of approval may be printed, painted, embossed or otherwise formed on the top of the triangular portion 41 between the window openings 45 in which the lamps 22 and 23 are disposed.

In order to enclose the frame 13 and protect the lead conductors which connect the lamps and resistors with the terminal prongs against damage, the frame may be entirely enclosed within the jacket or casing 24, between the opposite ends of the frame, that is to say, between the top surface of the triangular portion 41, from which the signaling lamp covers S protrude, and the bottom surface of the disc 29 from which the terminal prongs 15, 17 and 19 project. To this end, the housing or casing 24 may comprise a generally cylindrical shell of elastomeric material having formed, in its upper end, a triangular opening 71 with rounded corners configurated to snugly receive the correspondingly shaped sides and corners of the triangular portion 41 of the frame 13. At its opposite or lower end, the casing 24 may be formed to snugly engage the peripheral edge of the disc portion 29 of the frame.

Accordingly, the lower end of the member 24 may have generally circular configuration and may be provided with integral, inwardly extending, longitudinal ribs 73 sized, shaped and positioned to extend interfittingly in the orientation grooves 35 of the frame 13. Inwardly of its lower end and parallel thereto, the inner surfaces of the member 24, between the ribs 73, may be formed with arcuate alined grooves 67 shaped to snugly receive the anchoring lips 37 of the frame. At and adjacent the upper ends of the ribs 73, and in alinement therewith, the inner surfaces of the member 24 may be formed with chordal embossments 77 in position to bear upon the outwardly facing surfaces of the legs 51 of the frame section 27. Immediately upwardly of the chordal embossments 77, and in centered longitudinal alinement therewith, the inner wall surfaces of the member 24 may be formed with integral extensions 79 of said embossments, said extensions being shaped to snugly interfit within the depressed seats 49 of the frame component 27.

The housing sleeve 24 preferably comprises a molded member of elastomeric material such as synthetic rubber, including butyl rubber, chloroprene rubber, nitrile rubber and isoprene rubber, or polyvinyl chloride. The medial portions of the cylindrical outer surfaces of the housing sleeve 24 may be formed to a diameter somewhat less than the diameter of the sleeve at its opposite ends, to thereby provide cylindrical lands 81 at the opposite ends of the member and a cylindrical depressed seat 83 between the lands 81 for the reception of an instruction sheet containing information as to the use of the device, including representations of the lamps 21, 22 and 23 indicating the differential actuation of the same in response to the various possible socket wiring conditions detectable by insertion of the prongs of the testing device into the prong receiving openings of the receptacles to be tested. The casing or housing sleeve 24 may be applied on the frame 13, after the mounting and connection of the indicating lamps therein, by expanding or stretching the same, as in a suitable jig or assembly fixture, sufficiently to permit the frame to be inserted axially into the casing, which may then be released from the jig for contraction upon the frame.

It is thought that the invention and its attendant advantages will be fully understood from the foregoing description, and it is obvious that numerous changes may be made in the form, construction and arrangement of the several parts without departing from the spirit or scope of the invention or sacrificing any of its attendant advantages, the form herein disclosed being a preferred embodiment for the purpose of demonstrating the invention.

The invention is hereby claimed as follows:

1. A circuit tester for electrical outlet sockets comprising an elongated frame forming an enclosing housing having opposite ends, hot, neutral and ground electrode prongs on and extending from said frame, at one end thereof, in position for insertion in an outlet socket in electrical contact with the corresponding hot, neutral and ground electrodes of the socket, said frame being formed with at least three adjacent lamp chambers therein, said chambers having window openings at the opposite end of the frame, remote from said prongs, and signaling lamps, each electrically connected between a corresponding pair of said electrode prongs, each lamp being disposed in a corresponding one of said chambers, and a translucent window cover secured in each of said window openings and marked to interdistinguish the same, each from the other, when illuminated by the lamp in the corresponding chamber said chambers being disposed in side-by-side, longitudinally extending and sectionally triangular arrangement, whereby the window covers form a triangular array in position to be viewed at the prong remote end of the frame.

2. A circuit tester, as set forth in claim 1, wherein said translucent window covers are interdistinguishably color tinted.

3. A circuit tester, as set forth in claim 1, wherein a said window cover comprises a hollow cup-shaped member of resilient molded plastic material providing a closed dome, at one end, and an open-ended skirt, at the opposite end, said skirt being notched to permit the skirt to be contracted for insertion in the end opening of a lamp chamber in mounting the cover therein.

4. A circuit tester, as set forth in claim 3, wherein the hollow cup-shaped member is formed with a peripheral shoulder, between the dome and the skirt and facing toward dome remote end of the skirt, in position to engage the end of the housing around a said window opening, to support the cover in said opening and a latching lip formed on the skirt and spaced from the peripheral shoulder in position to engage with the housing at the window opening to secure the cover in mounted position therein.

5. A circuit tester, as set forth in claim 1, wherein the frame comprises separately formed base and housing sections secured together in end-to-end relationship to form the opposite ends of the frame, said electrode prongs being secured on and extending from said base section, said lamp chambers being formed in said housing section and said lamps each having a pair of connection conductors electrically and mechanically connected with the ends of a corresponding pair of said electrode prongs within the housing and being thereby supported each in a corresponding chamber.

6. A circuit tester, as set forth in claim 5, wherein the sides of said housing section are formed with lateral openings opposite and affording access to the connection conductors and the conductor connected ends of the prongs, and an enclosing jacket sleeve of flexible material snugly embracing and enclosing the sides of said frame and covering said lateral openings.

7. A circuit tester for electrical outlet sockets comprising separately formed molded plastic base and housing sections secured together to form a support frame, said base section comprising a disc having hot, neutral and ground wire electrode prongs extending through the disc and providing connection lugs above and contact prongs below the disc in position for engagement with the corresponding hot, neutral and ground wire terminals of an outlet socket, said base section having upwardly projecting partitions extending radially from the center of said disc between each adjacent pair of connection lugs, the outer ends of said partitions forming mounting pedestals, said housing section having a body formed with circumferentially spaced support legs extending from its lower end and formed with feet for interfitting engagement with said mounting pedestals, to secure the housing section to and upon the base section, the upper end of said body, remote from said base, being formed with longitudinally extending chambers, disposed in parallel, side-by-side relation, a visual signalling device mounted in each of said chambers, each signalling device being electrically connected between a corresponding pair of said connection lugs, said housing having a window opening into each chamber, through which said signalling devices, when energized, may emit visual signals outwardly of the housing section, at its upper end, remote from said base and a jacket sleeve embracing and enclosing the frame from and including the periphery of the disc to and including the upper end of the housing section.

8. A circuit tester as set forth in claim 7, wherein the base and housing sections are integrated after connection of the signaling devices with the lugs of the electrode prongs, and before application of the jacket sleeve, by applying a plastic solvent to the feet of the legs of the housing section and holding the same upon the pedestals of the base section.

9. A circuit tester as set forth in claim 7, wherein the frame is made of a high impact, rigid plastic, and the jacket sleeve is preformed of elastic material and is mounted by expanding it for application around the frame and then permitting the sleeve to contract upon the frame.

10. A circuit tester as set forth in claim 7, wherein the frame is formed with seats and ribs, and the jacket sleeve is formed with corresponding projections and cavities shaped respectively for interfitting engagement with said seats and ribs.

11. A circuit tester as set forth in claim 7, wherein the windowed end of the frame is of triangular configuration with rounded corners, while the jacket sleeve has a corresponding triangular opening with rounded corners at one end to snugly receive the windowed end of the frame.

References Cited

UNITED STATES PATENTS

| 2,229,927 | 1/1941 | Kamper | 324—51 |
| 2,598,775 | 6/1952 | Fischer | 324—66 |
| 2,848,681 | 8/1958 | McKeige et al. | 324—51 |
| 2,956,229 | 10/1960 | Henel | 324—133 |
| 3,032,738 | 5/1962 | Bonanno | 339—176 X |
| 3,119,997 | 1/1964 | Kuhn et al. | 340—252 X |
| 3,317,825 | 5/1967 | Huff | 324—66 X |

FOREIGN PATENTS 807,544 1/1959 Great Britain.

RUDOLPH V. ROLINEC, *Primary Examiner.*

WALTER L. CARLSON, *Examiner.*

G. R. STRECKER, *Assistant Examiner.*